United States Patent [19]
Sakai

[11] Patent Number: 6,120,111
[45] Date of Patent: Sep. 19, 2000

[54] BRAKE HYDRAULIC CIRCUIT FOR MOTOR VEHICLES

[75] Inventor: Koji Sakai, Hamakita, Japan

[73] Assignee: Nisshinbo Industries, Inc., Tokyo, Japan

[21] Appl. No.: 09/123,452

[22] Filed: Jul. 28, 1998

[30] Foreign Application Priority Data

Aug. 4, 1997 [JP] Japan ................................. 9-221940

[51] Int. Cl.⁷ ................................................ B60T 8/40
[52] U.S. Cl. .................... 303/116.1; 303/113.2; 303/116.2; 303/119.1; 303/115.1; 303/DIG. 11
[58] Field of Search .................. 303/116.1, 116.2, 303/119.1, 900, 901, DIG. 3, 116.3, 116.4, 113.2, 115.4, 115.5, 113.1, 115.1, DIG. 11

[56] References Cited

U.S. PATENT DOCUMENTS

| | | | |
|---|---|---|---|
| 4,618,189 | 10/1986 | Nakanishi et al. | 303/115.4 |
| 5,013,097 | 5/1991 | Gutzait et al. | 303/116.2 |
| 5,058,961 | 10/1991 | Mergenthaler et al. | 303/115.4 |
| 5,169,216 | 12/1992 | Schmidt et al. | 303/116.2 |
| 5,275,477 | 1/1994 | Schaefer et al. | 303/113.2 |
| 5,290,098 | 3/1994 | Burgdorf et al. | 303/115.4 |
| 5,484,194 | 1/1996 | Reinartz et al. | 303/113.2 |
| 5,700,070 | 12/1997 | Sakai | 303/115.4 |
| 5,806,939 | 9/1998 | Feigel et al. | 303/DIG. 11 |

*Primary Examiner*—Douglas C. Butler
*Attorney, Agent, or Firm*—Arent Fox Kintner Plotkin & Kahn, PLLC

[57] ABSTRACT

A brake hydraulic pressure circuit for increasing the speed of pressure increase at the wheel cylinder by the simple hydraulic circuit. An accumulator is connected to the discharging side of the pump of the hydraulic return circuit via a first switching valve. A hydraulic supplying circuit, branching from the line between the first switching valve and the accumulator, is connected to the suction side of the pump of the hydraulic returning circuit via a second switching valve. Brake fluid reserved in the accumulator is then supplied to the main hydraulic circuit and is supplied to the suction side of the pump via the hydraulic supply circuit.

6 Claims, 9 Drawing Sheets

BRAKE HYDRAULIC CIRCUIT FOR MOTOR VEHICLES

BACKGROUND OF THE INVENTION

This invention relates to a brake hydraulic circuit for motor vehicles.

Traditionally, a large accumulator is added to a brake hydraulic circuit in order to secure the pressure increase speed of brake fluid to a vehicle wheel cylinder while in operating a traction control system (TCS) and a vehicle behavior control system. In this type, discharge pressure from a pump is reserved in the large accumulator, and the fluid is supplied from the large accumulator to a main hydraulic line to improve the brake pressure increase speed of the wheel cylinder.

However, the conventional method has the following disadvantages.

Adding a large accumulator not only increases the number of devices and cost but also enlarges the unit.

OBJECTS AND SUMMARY OF THE INVENTION

It is an object of this invention to improve the brake hydraulic pressure increase speed of a wheel cylinder by providing a simple hydraulic circuit.

This invention is a brake hydraulic circuit for motor vehicles, which includes a master cylinder, a wheel cylinder, a main hydraulic circuit supplying hydraulic pressure from the master cylinder to the wheel cylinder via an inlet valve and a hydraulic return circuit returning the hydraulic pressure from the wheel cylinder to the main hydraulic circuit via an outlet valve and a pump. An accumulator is connected with the discharging side of the pump in the hydraulic return line via a first switching valve. A hydraulic supply circuit, branching from the line between the first switching valve and the accumulator, is connected with the suction side of the pump of the hydraulic return circuit via a second switching valve. In this manner, brake fluid reserved in the accumulator is supplied to the main hydraulic circuit and is supplied to the pump via the hydraulic supply circuit.

A second aspect of this invention is a brake hydraulic circuit for motor vehicles wherein an accumulator is connected with the discharging side of the pump in the hydraulic return line via a pressure limit valve. A hydraulic supply circuit, branching from the line between the pressure limit valve and the accumulator, is connected with the suction side of the pump of the hydraulic return circuit via a second switching valve. A hydraulic branching circuit connects the suction side of the pump of the second switching valve of the hydraulic supply circuit to the discharging side of the pump of the hydraulic return circuit. This brake fluid reserved in the accumulator is supplied to the main hydraulic circuit and is supplied to the pump via the hydraulic supply circuit.

The invention can include a brake hydraulic circuit for motor vehicles as above, wherein the predetermined pressure of the accumulator is set to be larger than a resistance within the hydraulic circuit where fluid flows to the wheel cylinder via the first switching valve or the second switching valve and the hydraulic branching circuit.

The invention can include a brake hydraulic circuit for motor vehicles as above, wherein a fourth switching valve is placed between the master cylinder and the inlet valve, and an auxiliary hydraulic circuit, branching from the line between the master cylinder and the fourth switching valve, is connected to the suction side of the pump of the hydraulic return circuit via a third switching valve.

The invention can include a brake hydraulic circuit for motor vehicles as above, wherein a pressure sensor or a pressure switch is provided in the hydraulic circuit between the accumulator and the first switching valve.

The invention can include a brake hydraulic circuit for motor vehicles as above, wherein a stroke sensor or a stroke switch is provided at the accumulator.

The invention can include a brake hydraulic circuit for motor vehicles as above, wherein a pressure limit valve is provided in a line branching from the line between the accumulator and the second switching valve to the master cylinder side of the main hydraulic circuit.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

This embodiment of the invention is explained with reference to the figures.

Figure 1:
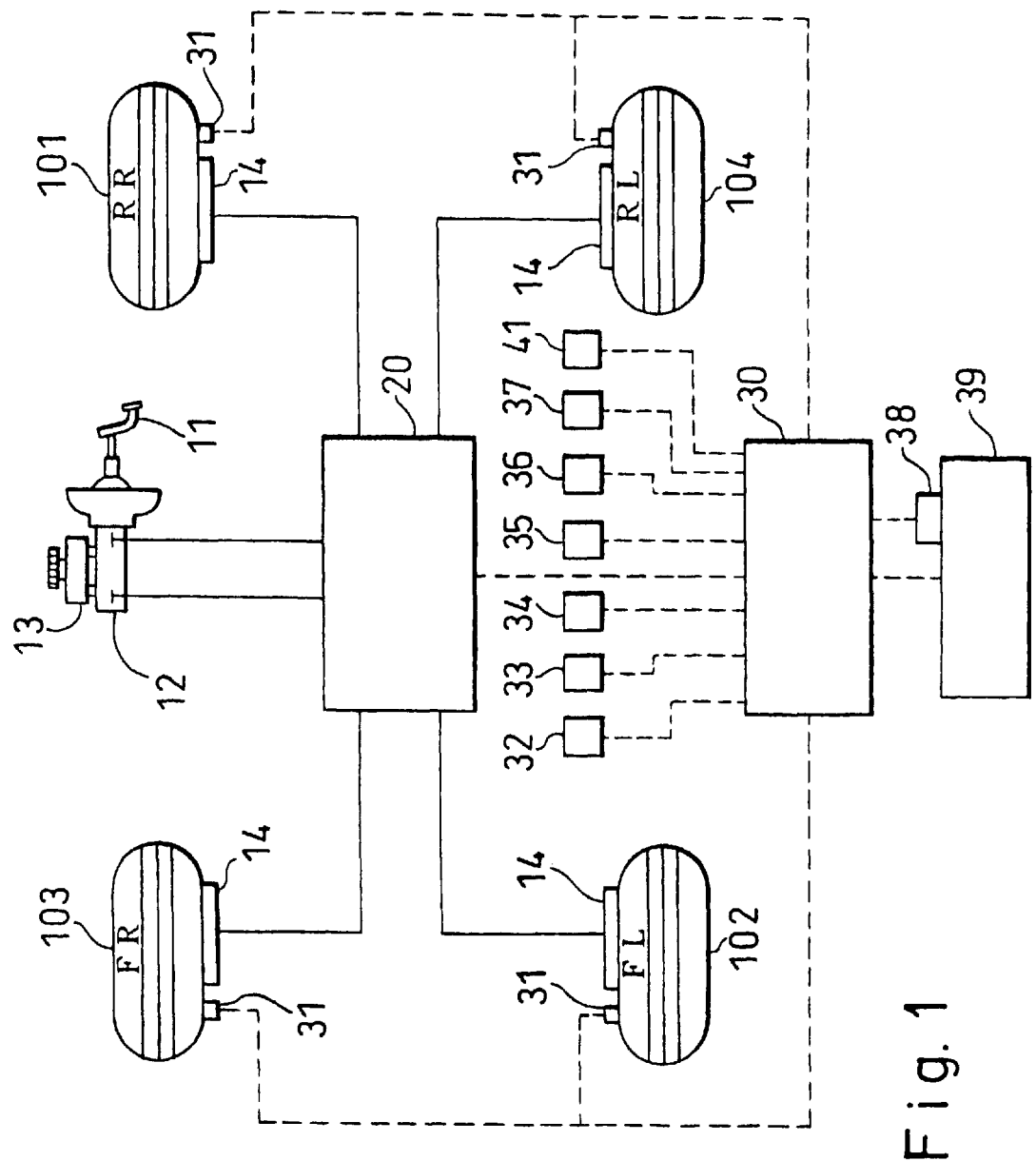
FIG. 1 is a summary view of the brake control device.

In a brake hydraulic control circuit for motor vehicles, as in FIG. 1, hydraulic pressure created in the hydraulic unit 20 is supplied to the respective front and rear wheel cylinders 14 to apply brake pressure on the respective wheel (front right wheel 103, front left wheel 102, rear right wheel 101, rear left wheel 104). For example, in a traction control system (TCS), a vehicle behavior control system, or an antilock brake control system (ABS), when wheels stop or show unusual rotation or movement, the most appropriate brake control is maintained by the electronic control device 30 controlling the hydraulic unit 20 based on signals from the wheel sensors 31, other sensors (e.g., the hydraulic pressure sensor 32, the G sensor 33, the yaw rate sensor 34, the steering angle sensor 35, the engine sensor 38) and switches (e.g., the fluid amount switch 36, the hydraulic pressure switch 37, the pressure sensor 41). At the same time, the most appropriate torque control is done at the engine part 39 of the electronic control device 30. The electronic control device 30 is equipped with its own hard wired device or computer-related device such as a microcomputer in order to carry out the appropriate functions.

Figure 6:
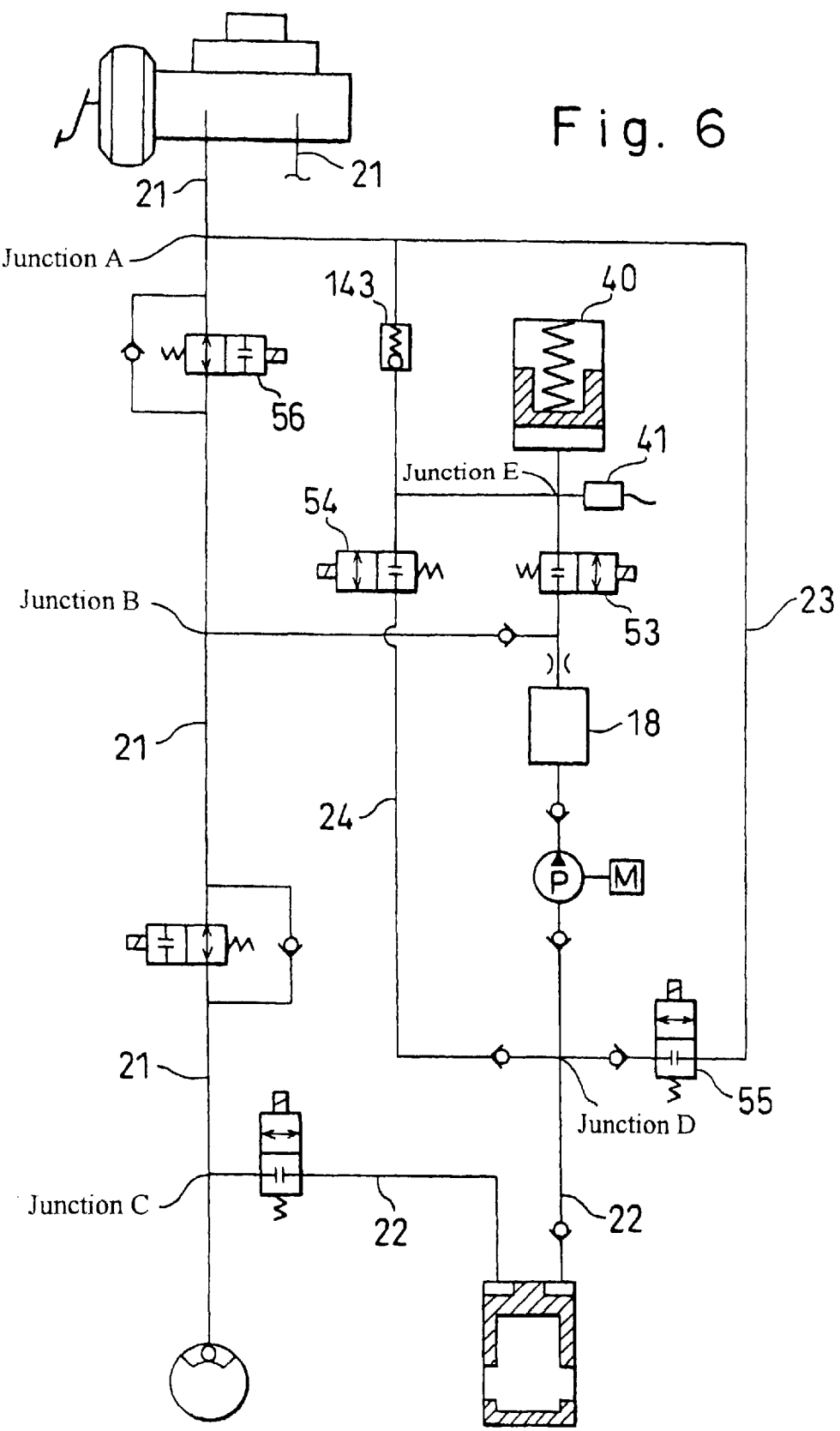
FIG. 6 is a view of the brake hydraulic control circuit for fifth and sixth embodiments for one wheel.
Figure 7:
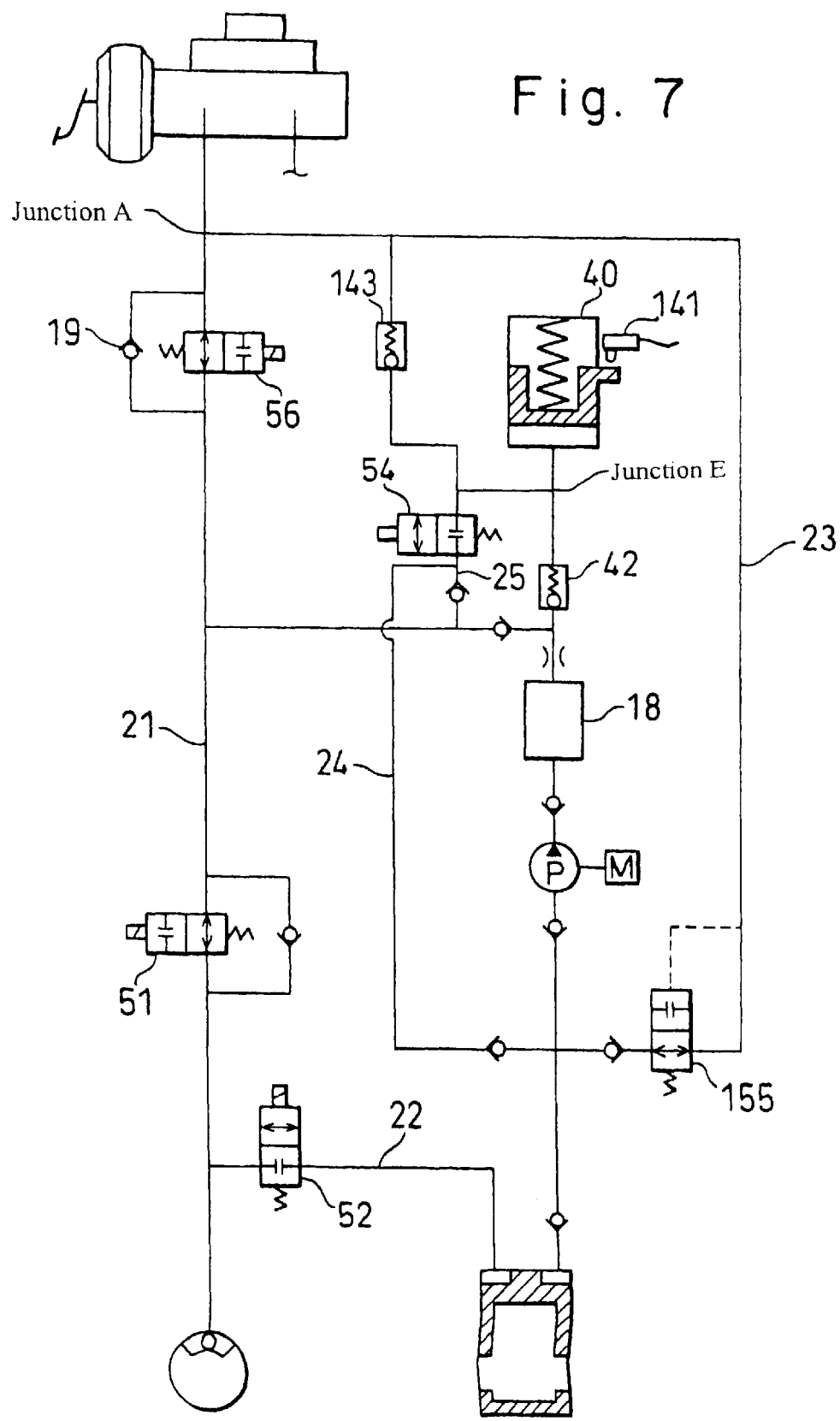
FIG. 7 is a view of the brake hydraulic control circuit for the sixth embodiment for one wheel.
Figure 8:
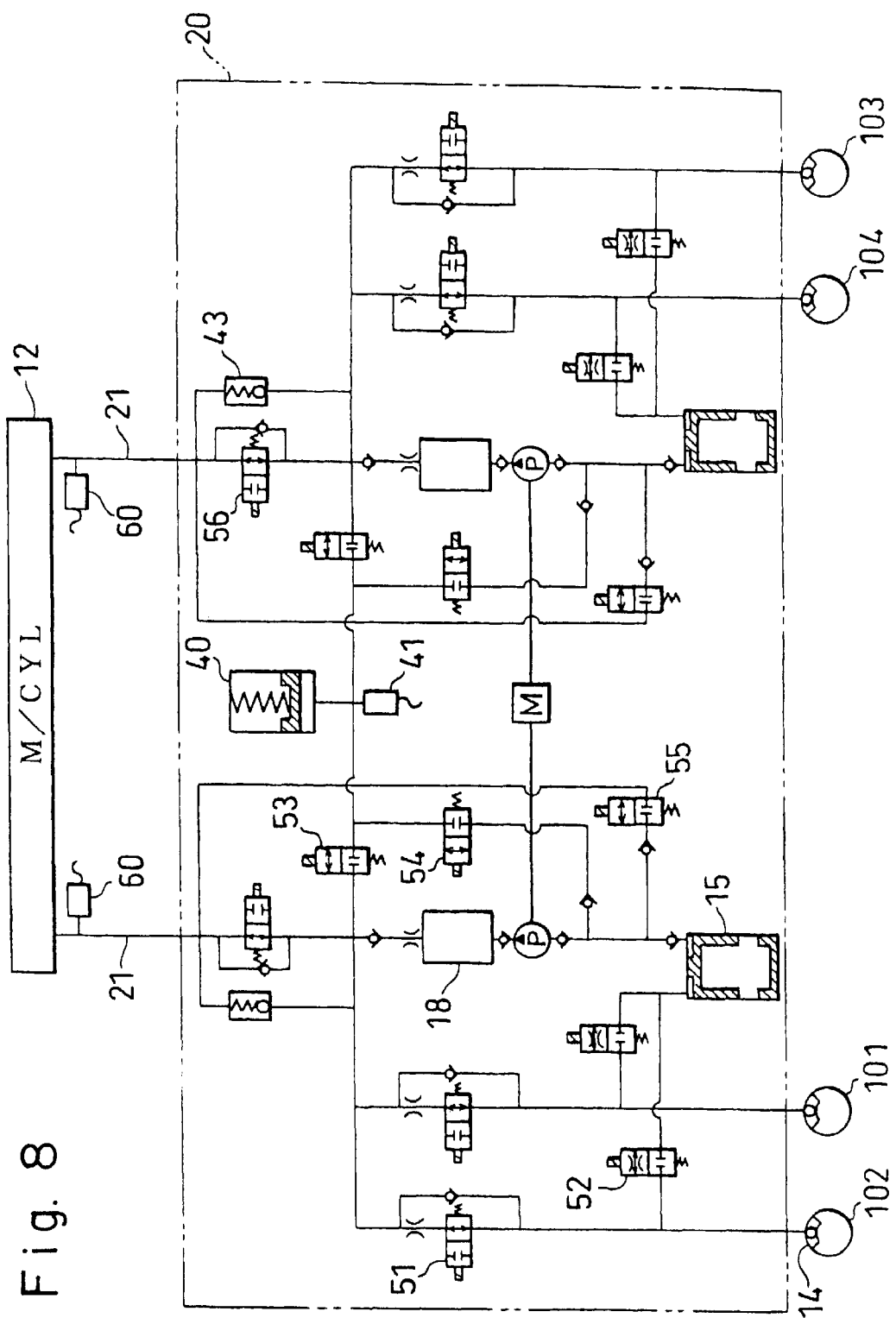
FIG. 8 is a view of a first arrangement for the brake hydraulic control circuit for four wheels.
Figure 9:
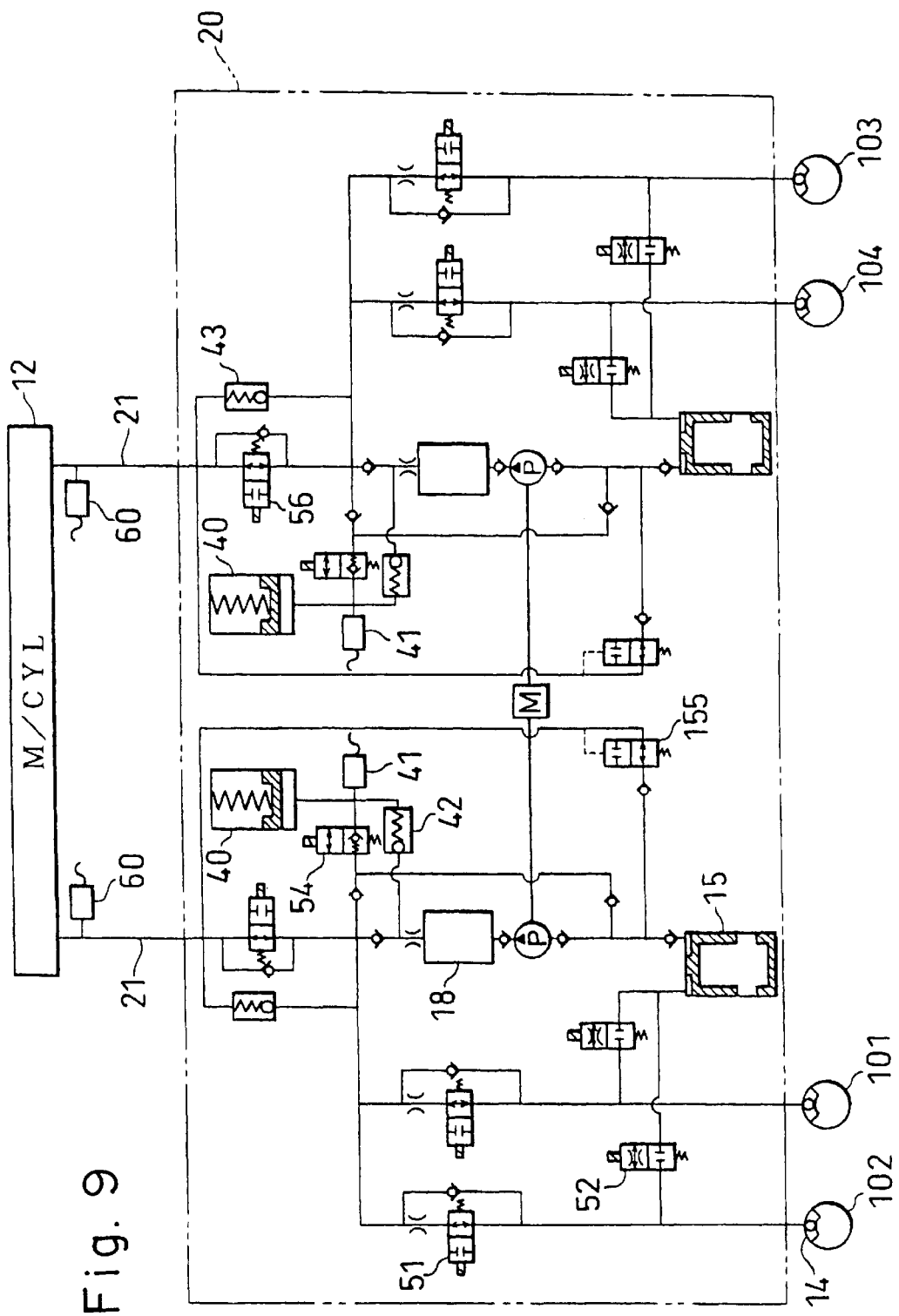
FIG. 9 is a view of a second arrangement of the brake hydraulic control circuit for four wheels.

Examples of the hydraulic unit 20 relating to one wheel 10 are shown in FIGS. 2 through 7, and examples of the hydraulic unit 20 relating to four wheels are shown in FIGS. 8 and 9. The hydraulic unit 20 functions as a hydraulic circuit for a traction control system (TCS), a vehicle behavior control system, an antilock brake control system (ABS), etc. FIGS. 8 and 9 use an example with a X-piping; there is a hydraulic circuit of the independent first and second systems; the front left wheel 102 and the rear left wheel 101 are connected to the main hydraulic circuit 21 of the first system; and the front right wheel 103 and the left rear wheel 104 are connected to the main hydraulic circuit 21 of the second system.

Each of the embodiments has a hydraulic unit 20 which comprises a main hydraulic circuit 21 connecting between a master cylinder 12 and a wheel cylinder 14, a hydraulic return circuit 22 returning brake fluid to the main hydraulic circuit 21 by a pump 16, an auxiliary hydraulic circuit 23 supplying the brake fluid from the master cylinder 12 to the pump 16, a hydraulic supply circuit 24 supplying the brake fluid from an accumulator to the suction side of the pump, and valves provided in the respective hydraulic circuits to control the opening and closing of the circuits to maintain the certain brake control relating to the respective wheel. Further, many check valves 19 are provided in the hydraulic circuits to prevent reverse flow, which is a safety factor.

The main hydraulic circuit 21 is a brake fluid line between the master cylinder 12 and the wheel cylinder 14. A fourth switching valve 56 and an inlet valve 51 are placed in this line. A first pressure limit valve (the first PLV) 43 can be provided in parallel to the fourth switching valve 56.

Figure 2:
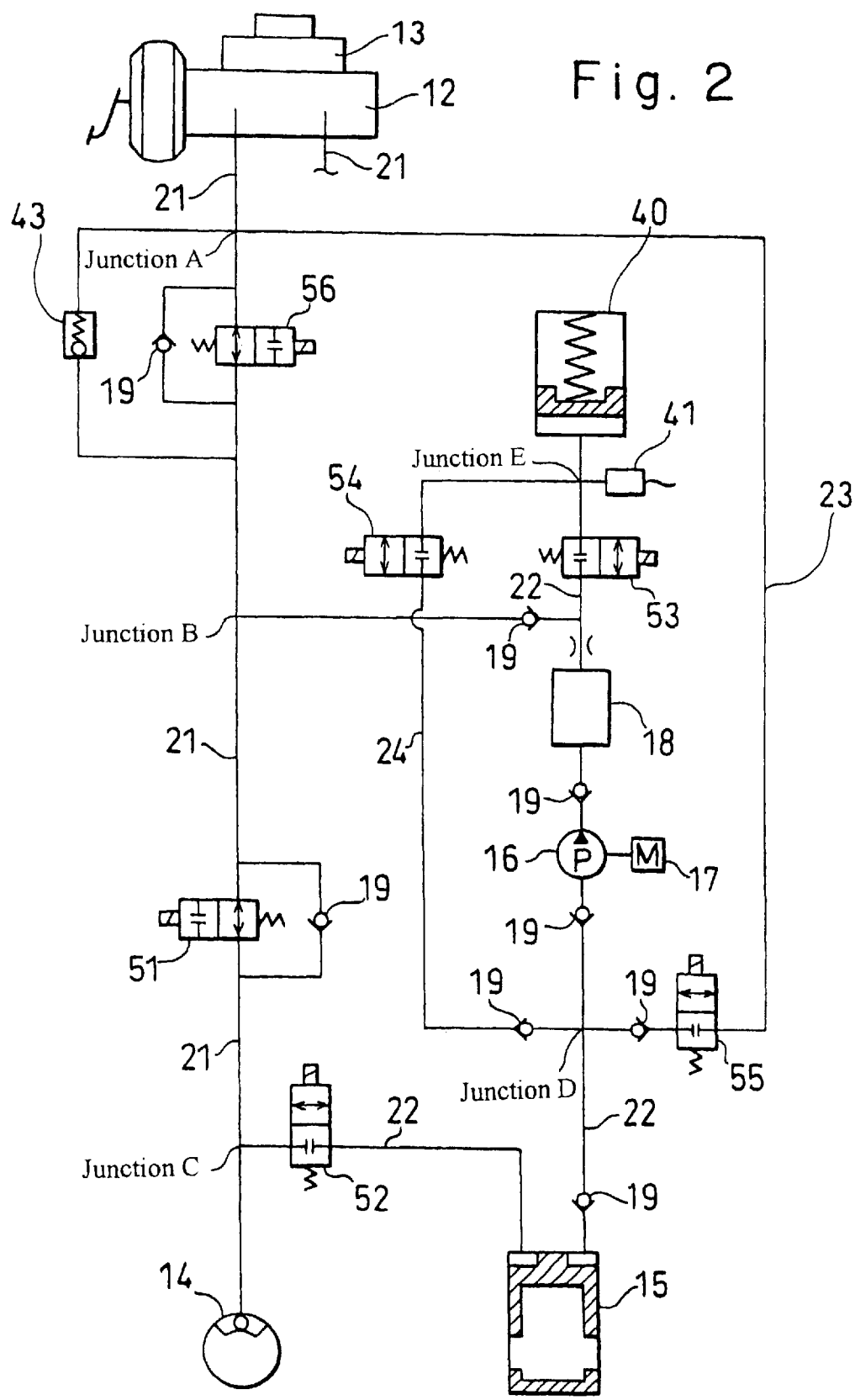
FIG. 2 is a view of the brake hydraulic control circuit for one wheel showing a first embodiment.

In a first embodiment for one wheel shown in FIG. 2, the hydraulic return circuit 22 returns the brake fluid of the wheel cylinder 14 to the main hydraulic circuit 21 and connects the wheel cylinder side (at junction C) of the main hydraulic circuit 21 to a position between the fourth switching valve 56 and the inlet valve 51 (at junction B). An outlet valve 52, an auxiliary reservoir 15, the pump 16, and a damping chamber 18 are placed in the hydraulic return circuit 22 in that order. The downstream side of the damping chamber 18 of the hydraulic return circuit 22 is connected with the accumulator 40 via a first switching valve 53. The pressure sensor 41 or the pressure switch to measure the hydraulic pressure is placed in the line between the accumulator 40 and the first switching valve 53.

A motor 17 drives the pump 16 and sucks the brake fluid to discharge to the damping chamber 18 side. The damping chamber 18 absorbs fluctuations of the brake fluid and is provided when necessary.

The auxiliary hydraulic circuit 23 is a fluid line supplying brake fluid from the master cylinder 12 to the pump 16. For example, the auxiliary hydraulic circuit 23 connects the master cylinder side (at junction A) of the main hydraulic circuit 21 and the hydraulic return circuit 22 (at junction D) at the suction side of the pump 16 via a third switching valve 55.

The hydraulic supply circuit 24 is connected from the connection (at junction E) between the accumulator 40 and the first switching valve 53 to the suction side of the pump 16 of the hydraulic return circuit 22 via a second switching valve 54. Brake fluid is supplied from the accumulator 40 to the pump 16. Accordingly, the pump 16 is able to discharge a large amount of the brake fluid rapidly.

Operation of the brake hydraulic control system is explained next with reference to the diagrams.

When applying normal braking, the fourth switching valve 56 and the inlet valve 51 are opened, and the first switching valve 53 and the outlet valve 52 are closed. Therefore, by pressing the brake pedal 11, brake hydraulic pressure created at the master cylinder 12 is supplied to the wheel cylinder 14 via the main hydraulic line 21 to apply a brake. As the brake pedal 11 is released, the hydraulic pressure at the master cylinder 12 is decreased, and the brake pressure at the wheel cylinder is decreased.

If the brake fluid is charged in the auxiliary reservoir 15 or is supplied from the outlet valve 52, the pump 16 draws the brake fluid and discharges to the dumping chamber 18 side. A portion of the discharged fluid is charged and is pressurized in the accumulator 40 through the first switching valve 53 which is open.

When no brake fluid is to be supplied to the suction side of the pump 16, brake fluid in the master cylinder 12 is supplied to the opened third switching valve 55, and the suction side of the pump 16 of the hydraulic return circuit 22 via the auxiliary hydraulic circuit 23 and the opened third switching valve 55. The brake fluid supplied is discharged to the damping chamber 18 side by the pump 16 and is supplied to the accumulator 40 via the open first switching valve 53.

In traction control, vehicle behavior control, or antilock brake control, when a brake fluid is supplied to the wheel cylinder 14, the first switching valve 53 is opened, and the brake fluid reserved in the accumulator 40 is directly supplied to the main hydraulic circuit 21 without passing through the pump 16, thereby supplying the brake fluid to the wheel cylinder 14 rapidly and a quick brake pressure increase speed.

That is, because of resistance within the circuit such as a check valve of a fluid line before and after the pump 16 and the reduction of the area of a fluid line, much of the hydraulic pressure of the accumulator 40 is lost on the way to the wheel cylinder 14. However, the brake fluid reserved in the accumulator 40 is directly supplied to the main hydraulic circuit 21 without passing through the pump 16; therefore, the hydraulic pressure loss may be prevented. Accordingly, the predetermined pressure of the accumulator 40 is only required to be larger than the resistance within the hydraulic circuit until the wheel cylinder 14 via the first switching valve 53. Hence, the predetermined pressure may be set lower, and a smaller accumulator 40 may be used.

At the same time, the second switching valve 54 is opened, and the brake fluid of the accumulator 40 is supplied to the pump 16 via the hydraulic supply circuit 24 to be discharged to the main hydraulic circuit 21.

By the above-explained operation, the brake fluid in the accumulator 40 may be replenished to prevent lack of discharging fluid of the pump 16 due to the decrease of the pump suction ratio of the pump 16 when in a low temperature environment.

Figure 3:
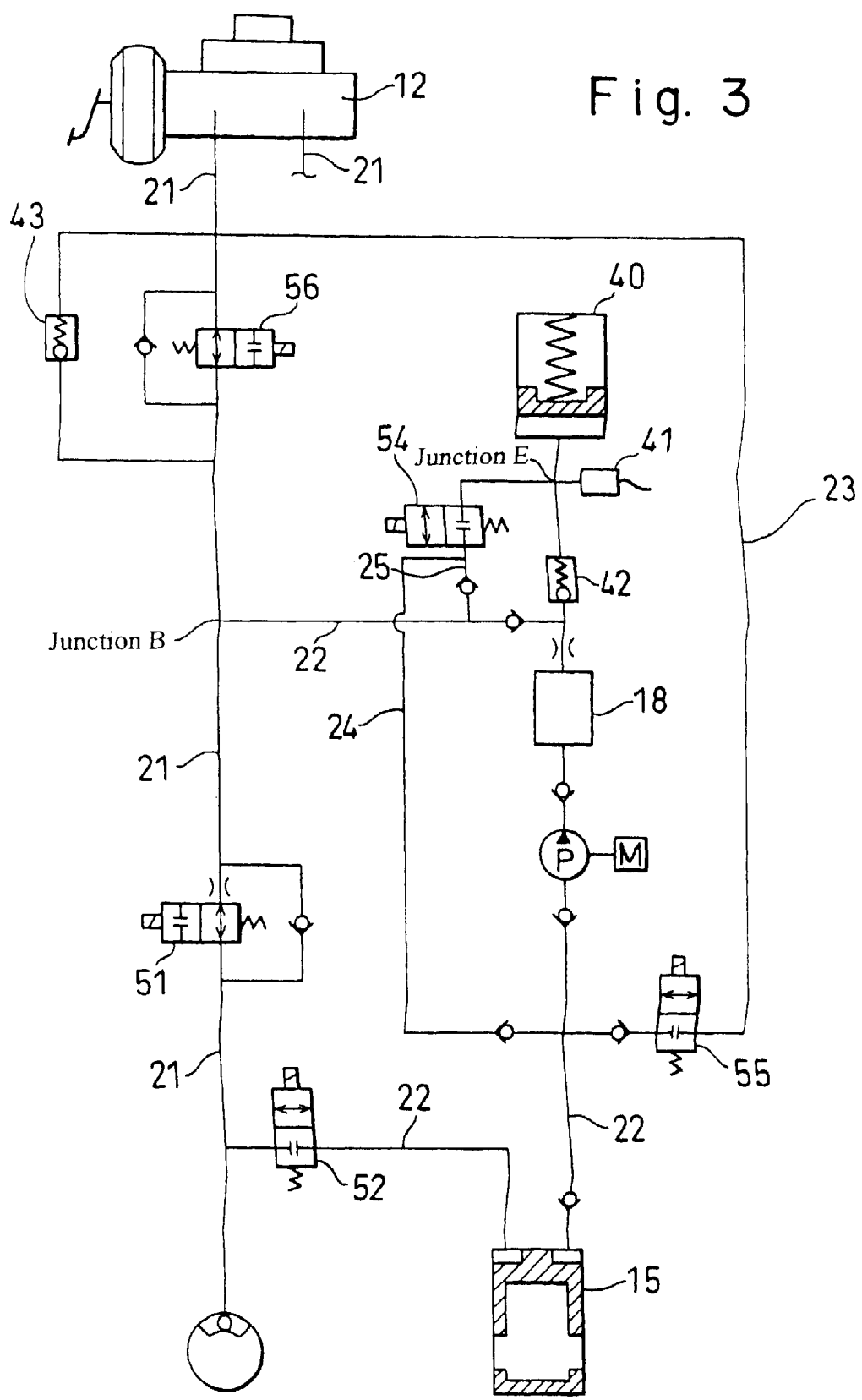
FIG. 3 is a view of the brake hydraulic control circuit for a second embodiment for one wheel.

In FIG. 3 showing a second embodiment, the first switching valve 53 of FIG. 2 may be replaced with a second pressure limit valve (the second PLV) 42. A hydraulic branching circuit 25 is provided to connect the outlet side of the second switching valve 54 of the hydraulic supply circuit to the inlet side (at junction B) of the inlet valve 51 of the main hydraulic circuit.

According to the above-structure, when the discharging pressure of the pump 16 becomes larger than the predetermined value, the second pressure limit valve 42 opens, and the brake fluid is automatically reserved in the accumulator 40. When the second switching valve 54 is opened, the brake fluid of the accumulator 40 is supplied to the main hydraulic circuit 21 via the hydraulic branching circuit 25 and is also supplied to the suction side (at junction D) of the pump 16 via the hydraulic supply circuit 24.

The first pressure limit valve 43 is designed to be larger than the second pressure limit valve 42. Therefore, the pumped fluid is reserved in the accumulator 40 with priority and is returned to the master cylinder side via the first pressure limit valve 43 when the accumulator 40 becomes full or the hydraulic pressure becomes excessive.

Figure 4:
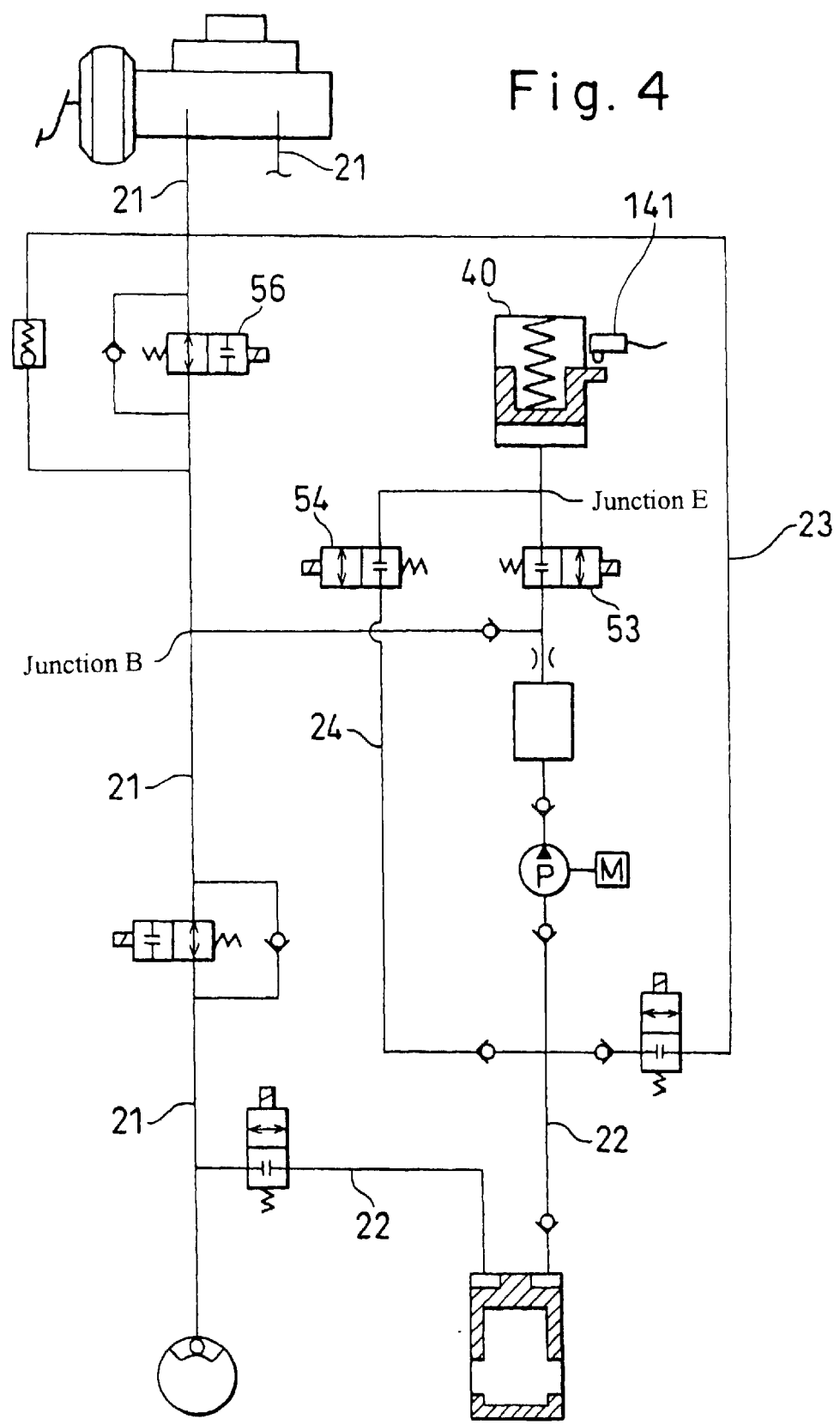
FIG. 4 is a view of the brake hydraulic control circuit for a third embodiment for one wheel.
Figure 5:
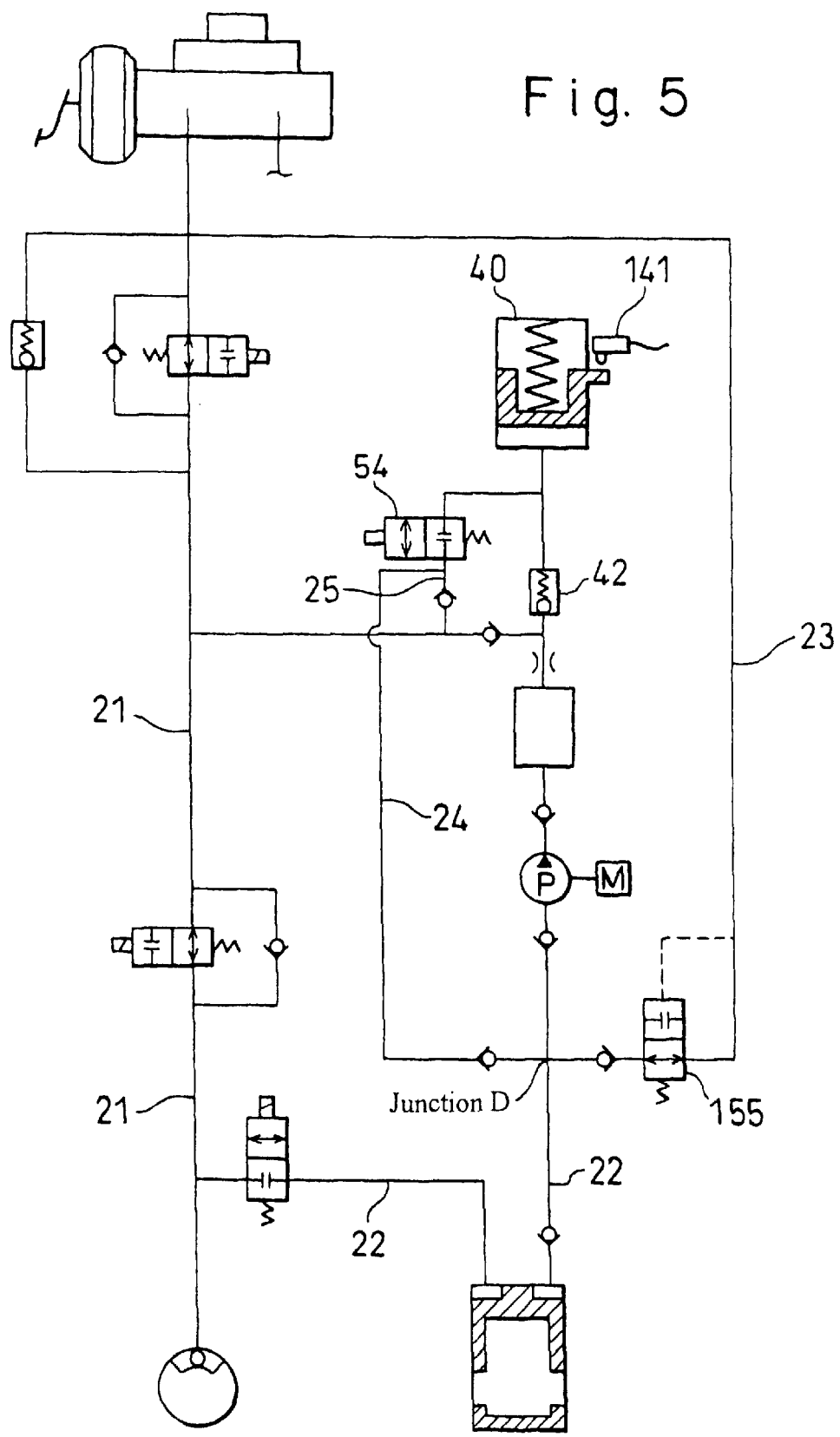
FIG. 5 is a view of the brake hydraulic control circuit for a fourth embodiment for one wheel.

In FIG. 4 and FIG. 5 showing a third embodiment, a stroke sensor 141 or stroke switch, may be placed at the accumulator instead of the pressure sensor 41 connected with the fluid line shown in FIGS. 2 and 3. This detects the amount of fluid within the accumulator and simplifies the connection and structure of the stroke sensor 141 or the switch.

In a fourth embodiment shown in FIG. 5, a mechanical type hydraulic valve 155 may be substituted for the third switching valve 55 of the solenoid valve of FIGS. 2–4. In this case, the hydraulic valve 155 is closed when the hydraulic pressure in the auxiliary hydraulic circuit 23 becomes larger than the predetermined value.

When the brake is not in operation, the fluid in the main reservoir 13 is sucked via the master cylinder by operating the pump. When the brake is in operation, the valve is closed and the fluid within the auxiliary reservoir 15 is returned to the main hydraulic circuit 21.

Instead of the first pressure limit valve 43 of FIGS. 2–5 in parallel with the fourth switching valve, in a fifth embodiment, a third pressure limit valve (the third PLV) 143, as in the FIGS. 6 and 7, is arranged in series with the first switching valve 53 or the second pressure limit valve (the second PLV) 42. This secures the reserved pressure within the accumulator 40, and the hydraulic pressure in the main hydraulic circuit 21 is not required to be excessively large. Further, this functions as a safety factor when the hydraulic pressure within the accumulator 40 becomes excessively large. In addition, FIG. 6 and FIG. 7 are comparable to FIG. 2 and FIG. 5, and the comparing figures to FIG. 3 and FIG. 4 are omitted here; however, the same type of arrangement may be used to connect the third pressure limit valve 143.

FIGS. 8 and 9 show arrangements, which apply the hydraulic circuit for one wheel as in FIGS. 2–5 to a hydraulic circuit for four wheels. In FIGS. 8 and 9, the parts which may be shared with the respective wheel are determined as required to save space and to reduce the number of the parts. For example, the accumulator can be shared with two systems as in FIG. 8 or separate accumulators can be used as in FIG. 9. FIGS. 8 and 9 show an example with an X-arrangement; however, other arrangements may be used as required. Further, a pressure sensor or pressure switch 60 can be provided to detect the hydraulic pressure at the master cylinder side of the main hydraulic circuit 21.

By supplying the brake fluid reserved in the accumulator directly to the main hydraulic circuit without passing through the pump, a rapid brake fluid supply to the wheel cylinder is possible.

Supplying the brake fluid reserved at the accumulator to the suction side of the pump improves the suction efficiency of the pump and the rapid supply of the amount of the pump discharging to the wheel cylinder is possible even when the suction efficiency decreases due to some special conditions such as a low temperature.

Pressure of the accumulator may be set to be low, and a smaller and highly reliable system may be provided.

The stroke sensor or the stroke switch can be placed at the accumulator to accurately detect the reserved pressure in the accumulator, which is also one factor of high reliability.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A brake hydraulic circuit for motor vehicles, which comprises:

a master cylinder, a wheel cylinder, a main hydraulic circuit supplying hydraulic pressure from said master cylinder to said wheel cylinder having an inlet valve, and a hydraulic return circuit returning said hydraulic pressure from said wheel cylinder to said main hydraulic circuit having an outlet valve and a pump, wherein an accumulator is connected with a discharging side of said pump in said hydraulic return circuit, a pressure limit valve is provided between said accumulator and said discharging side of said pump, a hydraulic supply circuit, branching from a line between said pressure limit valve and said accumulator, is connected with a suction side of said pump of said hydraulic return circuit, a second switching valve is provided in said hydraulic supply circuit, a hydraulic branching circuit connects a pump suction side of said second switching valve of said hydraulic supply circuit, said discharging side of said pump of said hydraulic return circuit, and said main hydraulic circuit, and a brake fluid reserved in said accumulator is supplied to said main hydraulic circuit and is supplied to said pump via said hydraulic supply circuit.

2. A brake hydraulic circuit for motor vehicles as claimed in claim 1, wherein a predetermined pressure of said accumulator is set to be larger than a resistance within said hydraulic circuit where fluid flows to said wheel cylinder via said second switching valve and said hydraulic branching circuit.

3. A brake hydraulic circuit for motor vehicles as claimed in claim 1 further comprising a fourth switching valve between said master cylinder and said inlet valve, and an auxiliary hydraulic circuit, branching from a line between said master cylinder and said fourth switching valve, and connected to said suction side of the pump of said hydraulic return circuit, said auxiliary hydraulic circuit including a third switching valve.

4. A brake hydraulic circuit for motor vehicles as claimed in claim 1 further comprising a stroke sensor or a stroke switch provided at said accumulator.

5. A brake hydraulic circuit for motor vehicles as claimed in claim 1 further comprising a pressure limit valve in a line branching from the line between said accumulator and said second switching valve to the master cylinder side of said main hydraulic circuit.

6. A brake hydraulic circuit for motor vehicles as claimed in claim 1, wherein a pressure sensor or a pressure switch is provided between said accumulator and said second switching valve.

* * * * *